May 7, 1963
L. J. BISHOP
3,088,419
FLEXIBLE RAIL TYPE STOP AND RELEASE
MECHANISM FOR OVERHEAD CONVEYOR
Filed Aug. 7, 1961
5 Sheets-Sheet 1
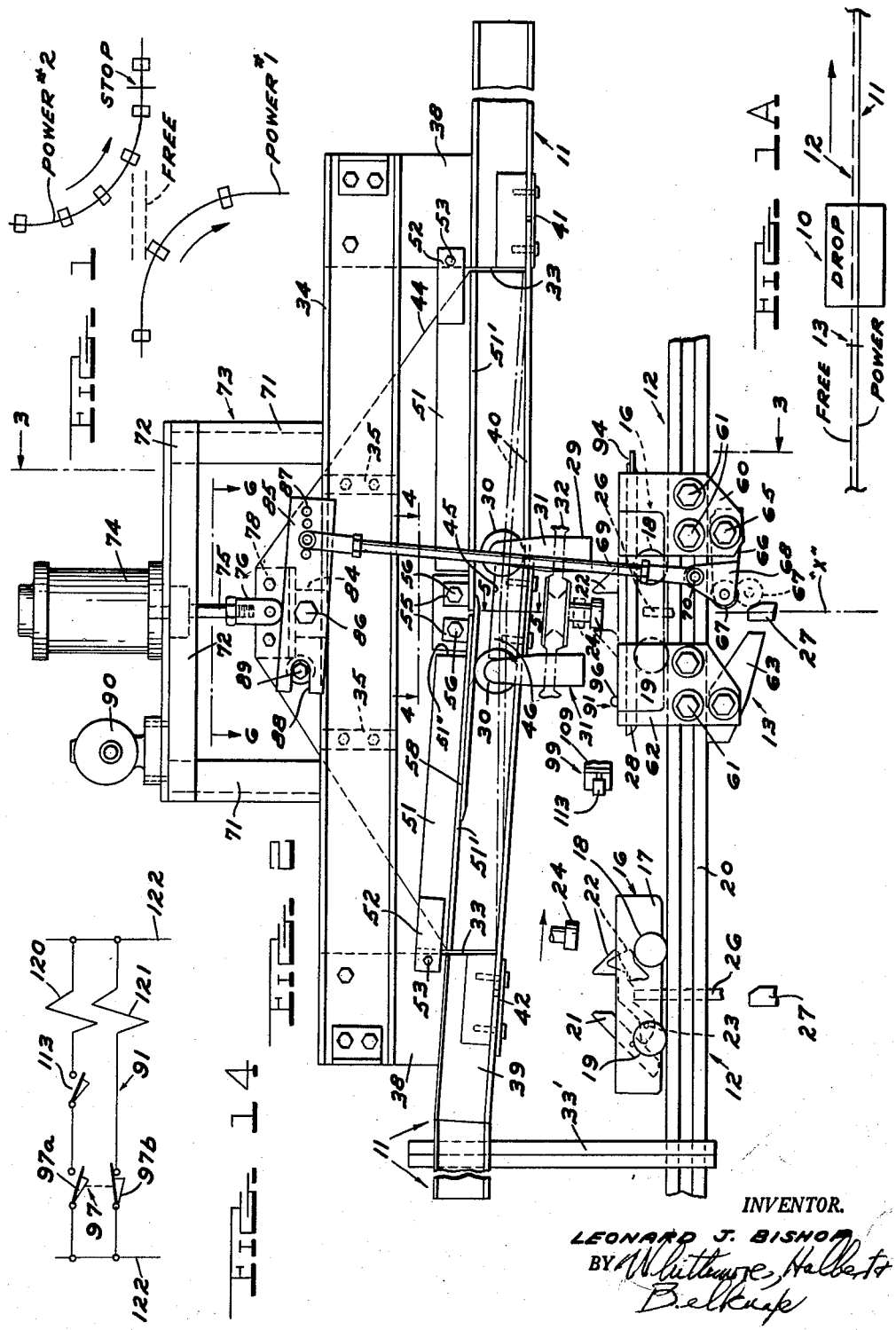
INVENTOR.
LEONARD J. BISHOP
BY
ATTORNEYS

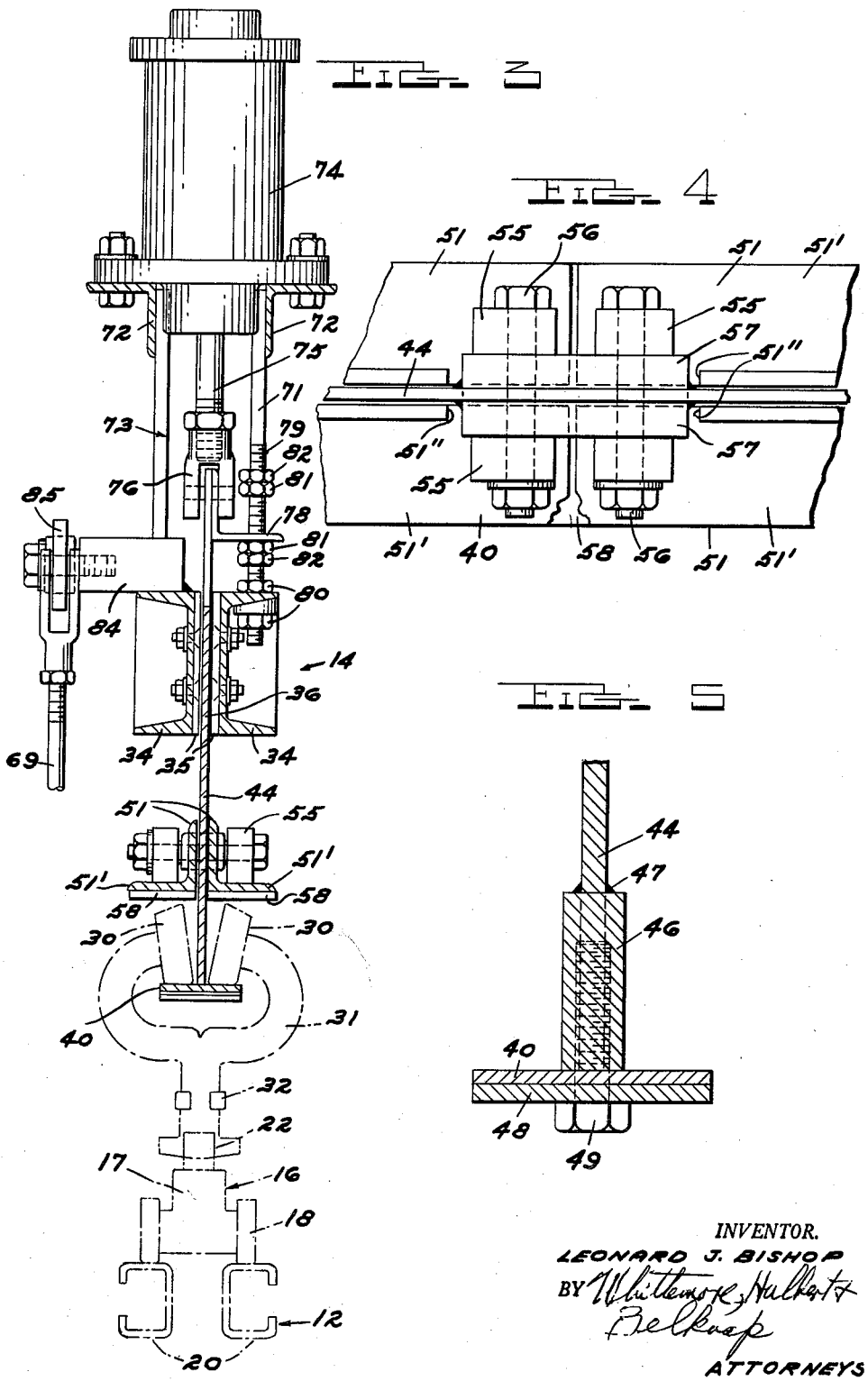

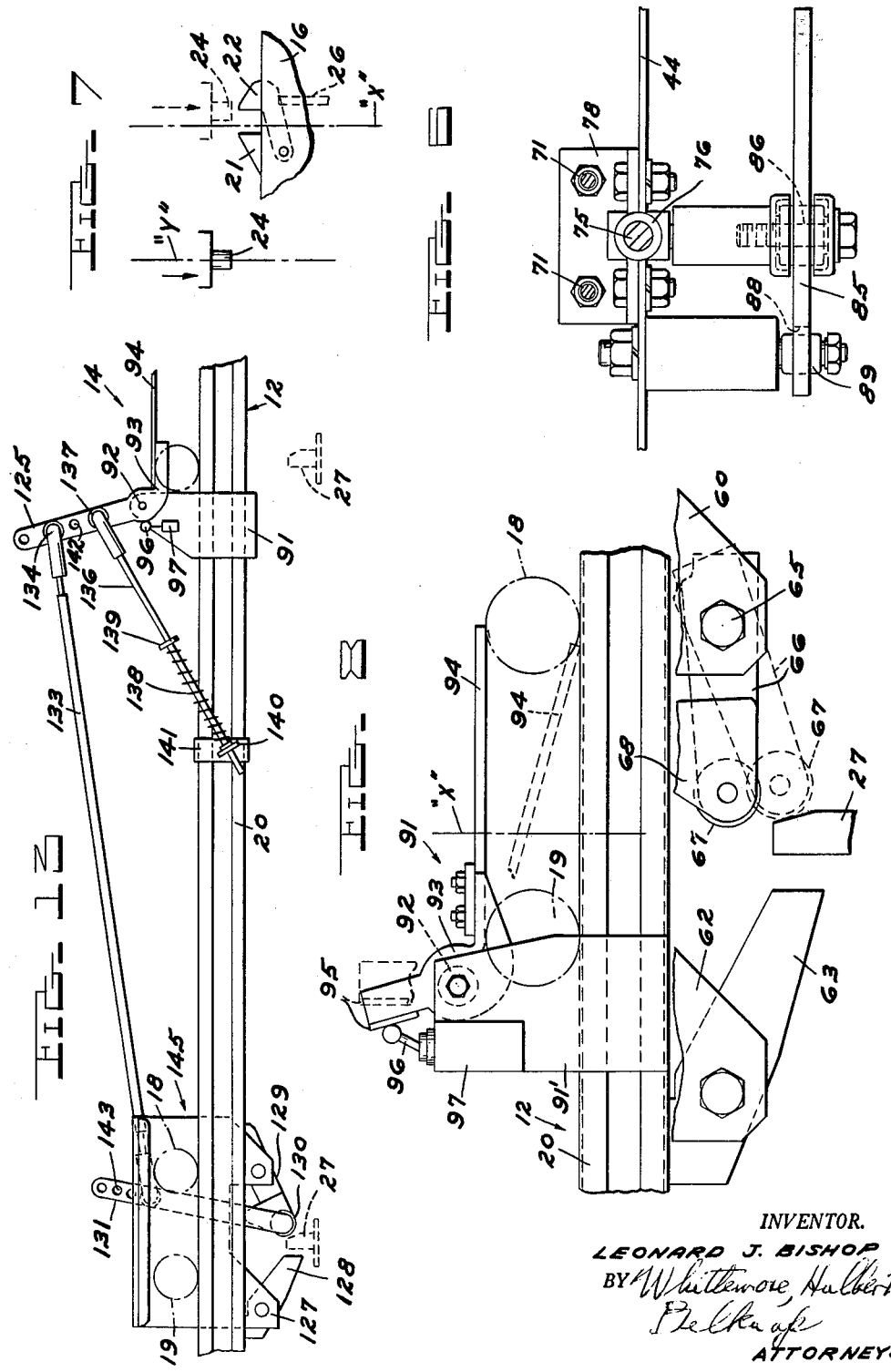

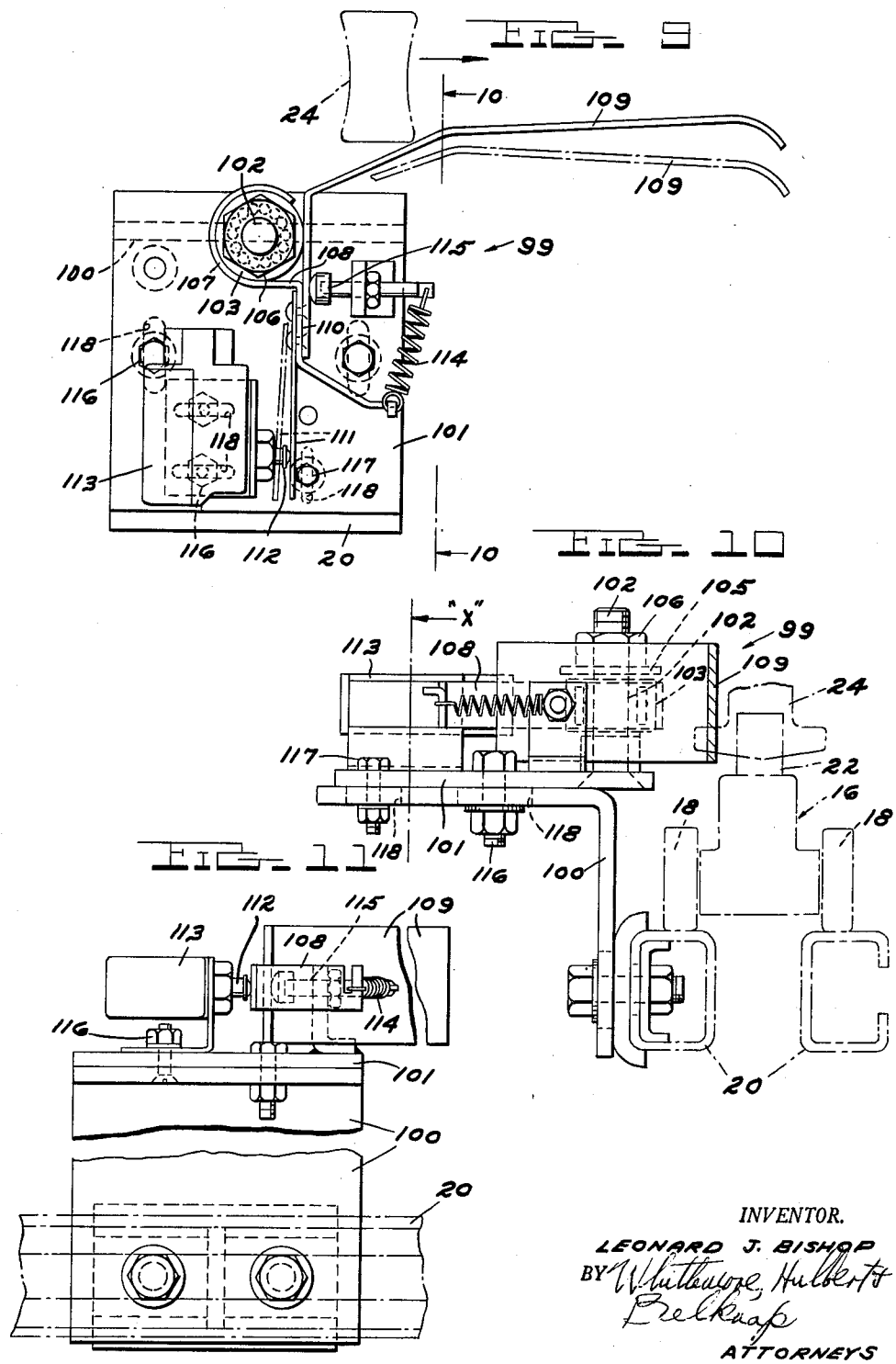

May 7, 1963

L. J. BISHOP 3,088,419

FLEXIBLE RAIL TYPE STOP AND RELEASE
MECHANISM FOR OVERHEAD CONVEYOR

Filed Aug. 7, 1961

INVENTOR.
LEONARD J. BISHOP
BY Whittemore Hulbert &
Belknap
ATTORNEYS

United States Patent Office 3,088,419
Patented May 7, 1963

3,088,419
FLEXIBLE RAIL TYPE STOP AND RELEASE MECHANISM FOR OVERHEAD CONVEYOR
Leonard J. Bishop, Birmingham, Mich., assignor to Mechanical Handling Systems, Inc., Detroit, Mich., a corporation of Michigan
Filed Aug. 7, 1961, Ser. No. 129,696
13 Claims. (Cl. 104—172)

The present invention relates to a flexible rail structure for an overhead conveyor or the like. More particularly, it relates to an improved stop and release mechanism to control the halting of load conveying units, such as the track-borne trolleys of an overhead conveyor system, at an accumulation or waiting zone of one sort or another to which they have been delivered along a free line or track, after release from overhead propulsion by a power chain or like actuator, prior to resuming the travel of such units or trolleys under power from above. One typical application is in an installation of a drop section for an overhead conveyor such as is shown in the patent to Bishop, No. 2,956,514, of October 18, 1960, although various other types of accumulation and collection stations may well be serviced by the improved stop and release mechanism of the present invention. Another and possibly more common application will be referred to, and still others will suggest themselves to those skilled in the art.

A stop and release type of trolley accumulation system has heretofore been proposed in which load-supporting trolleys travel a track under normal propulsion by pusher dogs of a power chain conveyor traveling a continuous track above the trolley track; and in which one or more individual ramp-like, auxiliary track members are associated with the pusher conveyor track. These auxiliary ramps are under automatic control originating at a forward stop station, being elevated in such a manner that the power chain pusher dogs ride up on them to an elevation such that the dogs pass over the successive trolleys halted therebeneath without exerting propelling force thereon. Upon signal, as when a preceding trolley has been released and gone forward, the auxiliary ramps are again lowered, thus lowering the power chain pusher dogs to an elevation for propelling engagement with the trolleys.

An arrangement of this sort involves the mounting of the accumulating track ramp or ramps at longitudinally spaced positions along a power conveyor of extended length, the system not being devised for the timed pickup and transfer of trolleys on a free line or track to the pushers of a power chain, to be propelled by the pushers further along their track, or along another track meeting the same at a junction zone.

In addition, there is a possibility that a power chain pusher dog, in returning downwardly toward a halted trolley at that time disposed directly beneath the pusher dog will collide against the top of the trolley pusher dog. This is an eventuality which might well be destructive in effect, particularly in a system handling automatically accumulating load supporting trolleys of a type illustrated and described in the copending application of Leonard J. Bishop and Paul Klamp, Serial No. 65,674, filed October 28, 1960.

The mechanism of the present invention involves the raising and lowering of overhead power chain pusher dogs in timed relation to the arrival and halting of trolleys at a stop and release station, but by means and in a manner to adapt the mechanism for less limited installation than as at present known to the art, and in a manner to avoid possibility of the destructive action referred to.

Thus, it is a general object of the invention to provide a stop and release mechanism which utilizes a horizontal elongated, vertically flexible track strip or rail device for the purpose of controlling the disengagement of a trolley by a power chain pusher and its driving re-engagement by such pusher at the proper time. The power chain conventionally includes its own roller-type trolleys riding an overhead monorail or the like, of which the flexible track rail device of the invention constitutes an intermediate length or continuation. Thus, when the flexible rail is in a relatively lowered position, the chain pushers will travel at an elevation to take propelling engagement with the pusher dog of a load trolley therebelow; whereas, if the flexible rail is in a relatively elevated position, such engagement cannot take place, and the chain pusher will pass over the dog of the load trolley.

Another general object is to provide a flexible rail device functioning as a continuation, intermediate or otherwise, of an overhead power chain trolley track to permit pushers of the power chain to be elevated and lowered as described. Although it is contemplated that the device will usually be employed as an adjunct of a stop and release mechanism, those skilled in the art will perceive that it is not necessarily so limited in application and may indeed be utilized independently of trolley stop and release provisions.

It is a further object to provide a stop and release mechanism in which the selective position of the flexible rail of the mechanism may be controlled on signal in accordance with conditions existing at the stop and release station, for example, the presence or absence of a load trolley at the station and its position in approaching the station.

In accordance with this object the invention provides a flexible rail device in association with a trolley stop and release unit, provision being made to insure that the power chain pusher shall not be lowered by the flexible rail to trolley propelling level, and a stop member of the unit shall not be released from trolley and load halting position, unless a trolley and its load are actually halted and waiting at the stop and release station; and to insure that the pusher is lowered prior to its arrival at the last named station. Otherwise, an approaching power chain pusher could take propelling engagement with the dog of a trolley approaching the station to drive the same into the latter, rather than permitting its approach to the latter as a free trolley. For this purpose, a limit switch signal from a halted trolley is required to initiate the release action of the mechanism.

A chain propelled pusher might also descend with destructive effect directly onto the halted trolley's pusher dog in the event that the dog of the halted trolley is rigidly sustained upwardly. To avoid this possibility a second limit switch device is provided which will insure that the power chain pusher is lowered to propelling position prior to arriving at a point at which it takes propelling engagement with the dog of the halted trolley.

A further object is to provide a flexible rail type stop and release mechanism of the above described sort, as combined with one or more stop and release devices to the rear thereof at which load supporting trolleys, whether of the automatically accumulating design or not, may accumulate at stations to the rear of the flexible rail station proper, then be successively released for approach to that station.

The foregoing as well as other objects will become more apparent as this description proceeds, especially when considered in connection with the accompanying drawings illustrating the invention, wherein:

FIG. 1 is a schematic top plan view illustrating the manner in which the mechanism of the invention may be employed typically in the control of the transfer of a trolley and load unit, as advanced onto a free track portion by one power conveyor driven at a given speed and having pushers in longitudinal predetermined spacing, to another power conveyor driven at a different speed and having a different spacing of pushers;

FIG. 1A is a schematic top plan view showing another typical installation of the present stop and release mechanism in an overhead power and free line system which incorporates a drop section, as at a dip tank station;

FIG. 2 is a fragmentary view in side elevation showing the invention in one embodiment thereof for the stop and release control of trolleys of the automatic impact-controlled accumulation type, parts of the mechanism being shown respectively in solid line, in which a power chain pusher is lowered in position for propelling with a trolley to resume its travel, and in dotted line position in which the pusher is elevated to pass by a trolley halted at the stop and release station;

FIG. 3 is a fragmentary enlarged view in transverse vertical section along line 3—3 of FIG. 2, showing in dot-dash line the outline of a power line trolley and its pusher, as well as a load trolley and its free track;

FIG. 4 is a fragmentary top plan view of the flexible rail device of the mechanism in still further enlarged scale, as viewed from line 4—4 of FIG. 2;

FIG. 5 is a fragmentary view in transverse vertical section along line 5—5 of FIG. 2;

FIG. 6 is a view in horizontal section along line 6—6 of FIG. 2;

FIG. 7 is a fragmentary schematic view in elevation illustrating the effect of the control of the mechanism in insuring that a power chain pusher will not be dropped directly onto the dog of a load trolley waiting at the stop and release station, but will be lowered prior to arrival at the station;

Figure 12:
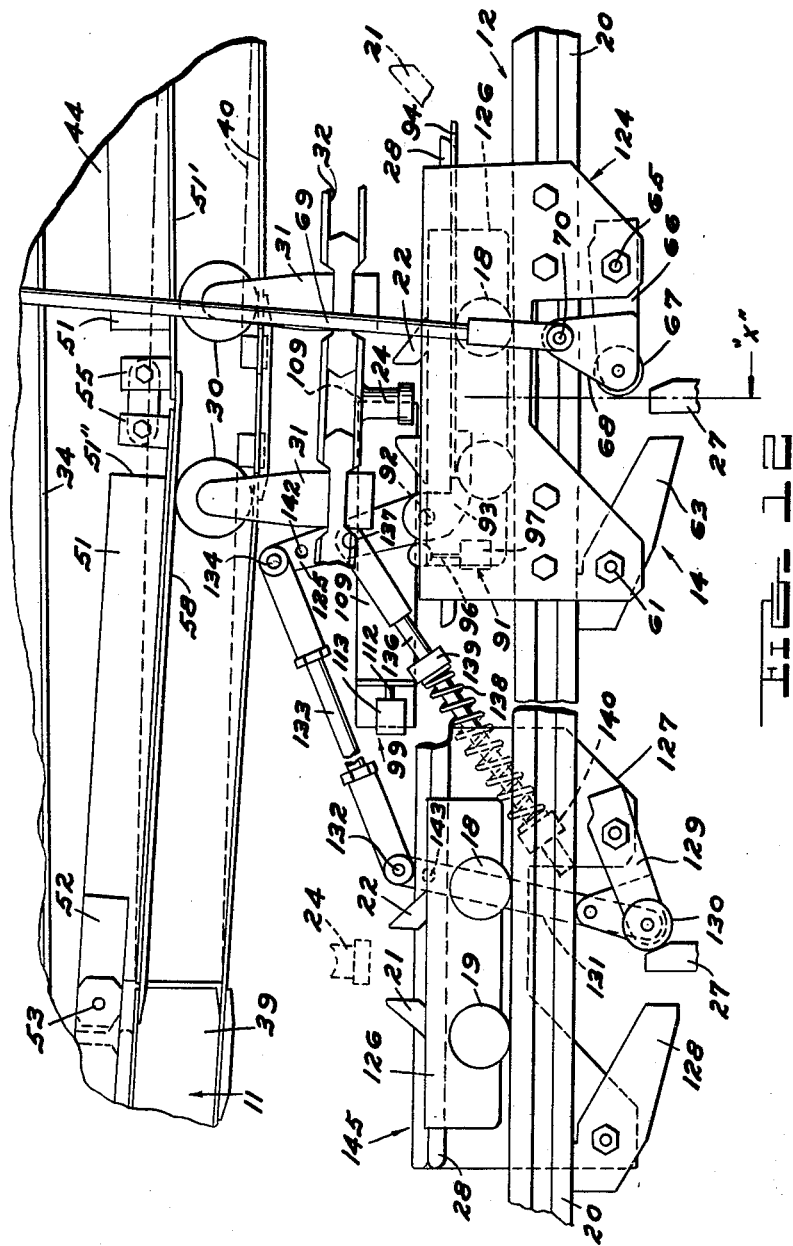

FIG. 8 is a fragmentary side elevational view showing a signal and control unit associated with the mechanism, through the agency of which the flexible rail provisions of the mechanism are prevented from operating and lowering a power chain pusher for propelling engagement with a load trolley unless a trolley is waiting at the stop and release zones, parts of this unit being shown in operated solid and non-operated dotted line positions;

FIG. 9 is a top plan view of a further signal and control unit for the purpose referred to in connection with FIG. 7, non-operated and operated positions of an actuating arm of the unit being shown, respectively, in solid and dot-dash line;

FIG. 10 is a view in transverse vertical section along line 10—10 of FIG. 9;

FIG. 11 is a fragmentary view, partially broken away, showing the unit in side elevation;

FIG. 12 is a fragmentary view in side elevation, similar to FIG. 2, but showing the principles of the invention as embodied in an installation in which trolleys of either the automatically or non-automatically accumulating type are enabled to accumulate in series, this view being partially broken away for compactness;

FIG. 13 is a fragmentary side elevational view further illustrating accumulation control instrumentalities of the modified mechanism of FIG. 12; and FIG. 14 is a simple schematic wiring diagram coordinating the functions of the signal units of FIG. 8 and FIGS. 9–11.

One typical installation of the stop and release mechanism of the invention is schematically shown in FIG. 1 of the drawings, in which a first overhead power chain conveyor having trolley pushers in predetermined spacing therealong rounds a 90° bend, upon which trolleys pushed thereby along a trolley track therebeneath are switched by an appropriate switching device onto a free trolley track, schematically depicted in dotted line in FIG. 1. These trolleys are later passed along manually or gravitationally to a second power conveyor at which they are halted by the stop mechanism of the invention, out of driving engagement by the pushers of the second power chain or conveyor, until a proper time for re-engagement and drive by the second power line.

The purpose of the mechanism would be to control the transfer from power conveyor #1 to conveyor #2 in such a way that the trolley is halted at a stop device where the second power conveyor can engage it and move it along, yet without the device releasing the trolley until the power chain pusher is latched in between the two conventional trolley dogs. Thus the trolley cannot accidentally coast or be pushed ahead to a point where a possible dip in the power and free lines would cause the trolley and its load to become a dangerous run-away. In this instance a trolley at the stop and release mechanism will contact a suitable signalling limit switch (per FIG. 8) and the approaching power chain pusher contacts a further signalling limit switch unit (per FIGS. 9–11), so that when both limit switches are actuated suitable means move the flexible rail of the mechanism down and its trolley stop up, enabling the trolley to be powered forward.

A second purpose might be to transfer the trolley and carrier from a first power chain of, say, 12 ft. spacing of its pushers to a second power line of 6 ft. pusher spacing, in such a way that only every other dog on the second line will move a trolley from the stop and release mechanism. In this instance an electrical control might be arranged so that only every other pusher of the second conveyor could move a trolley out of the stop and release mechanism. Thus the limit switch unit of FIGS. 9–11 would operate a suitable stepping relay with every second operation of this relay closing a contact in a circuit controlling movement of the flexible rail and stop.

In either of these instances a trolley supported load carrier approaching the one halted at the stop and release mechanism will merely contact it bumper to bumper, and since the power chain pusher clears over the top of the trolley dogs in the area behind the stop and release mechanism, such second carrier will simply wait until the first one is powered out of the mechanism, then roll into the stop position. In this fashion one or more load carriers can wait on the free track or rail until there is free space ahead.

In an optional third arrangement, shown in FIGS. 12 and 13 and hereinafter described, one or more trolley stops are added behind the first stop position. Thus if automatically accumulating type trolleys are used, in which the accumulating device might cause a second carrier to be accidentally towed away by the first carrier, particularly when the second carrier is empty, the secondary stop would hold the same until the first carrier and its trolley move out from the main stop and release station. Now the second stop would be released, the trolley halted there rolling into the main stop position. The additional stop may also be used for carriers not equipped with the usual protective bumpers, so that work pieces carried might collide and be damaged if the carriers were not kept apart.

FIG. 1A of the drawings schematically shows another typical installation of the mechanism of the invention in an overhead conveyor system which incorporates a drop section as shown in the Bishop patent identified above, at which section load trolleys and the carriers and loads suspended thereby are lowered to an elevation at which an operation of one sort or another may be performed upon the load, as by dipping the same in a suitable coating or treating tank. An equivalent section or unit is generally designated in FIG. 1A by the reference numeral 10; and structural features thereof constitute no part of the present invention. However, it is in connection with this type of drop section installation that the features of the invention will be specifically described, on the understanding that various still further settings of the latter will readily suggest themselves to those skilled in the art.

FIG. 1A shows, associated with the unit 10, a power conveyor of the usual monorail type, the reference numeral 11 being employed to designate generally the monorail track of this conveyor, the same being indicated in solid line. The reference numeral 12 generally designates a free track mounted in vertical alignment beneath the track 11, along which track load trolleys travel, whether freely under gravity or hand propulsion, or as propelled by the power chain whose trolleys travel track 11. The reference numeral 13 in FIG. 1A generally designates a station at which the stop and release mechanism of the present invention, generally designated 14 in the remaining figures, is located.

As indicated above, the flexible track and stop and release provisions of the mechanism 14 may be embodied in still other types of power and free overhead installation than those depicted in FIGS. 1 and 1A; however, the drop section installation schematically shown in FIG. 1A of the drawings serves adequately for a setting against which to describe the structure and operation of the mechanism 14.

It will be assumed that the installation of the invention illustrated in FIG. 2 of the drawings is one in which trolleys and suspended load carriers of the automatically self-accumulating type are employed, i.e., as illustrated and described in the above identified copending application of Bishop et al., Serial No. 65,674. However, the system of FIG. 2 may also be operated using trolleys lacking the self-accumulating feature.

However, as schematically illustrated in FIG. 2, a trolley generally designated 16 is provided having the usual body 17 on which pairs of outer, forward and rearward load rollers 18, 19, respectively, are journaled to ride the tops of transversely spaced longitudinal track members 20 of the free line track 12. Each trolley 16 has a rear, anti-rebound dog 21 pivoted thereon in the usual manner, as well as a forward pusher dog 22, which is rearwardly pivoted at 23 on trolley body 16. The dog 22 is, under control of the stop and release mechanism 14, adapted to be engaged by a pusher 24 of the overhead power conveyor chain to propel trolley 16 along the free line 12 in advancing the same forwardly from station 13 and onto the drop section 10.

Each trolley 16 is provided with a central vertical control rod 26 which engages beneath the forward trolley pusher dog 22 to hold the same upwardly in a position for propelling engagement with the pusher dog 24 in the manner indicated in FIG. 2. However, it is to be noted that prior to arrival at the stop and release station the trolleys resting or idling along the free track are at such an elevation that the pushers 24 pass thereover, even when the flexible rail of mechanism 14 is in lowered position.

The trolleys 16 support suitable load carriers and their usual protective bumpers (not shown in detail), each of which has fixed thereon an upright stop member 27. This is adapted to be engaged by a suitable part (hereinafter described) of the stop and release mechanism 14 as the trolley and load in question arrive at the stop and release zone 13, adjacent the entrance zone of the drop section 10.

A hold down rail 28 may be provided in fixed relation to and above one of the free track members 20 to downwardly restrain one set of the trolley track rollers 18, 19 at the stop and release station 13, hence prevent the trolley from rearing up as engaged and disengaged by a pusher 24.

As illustrated and described in the Bishop et al. application referred to above, the control rod 26 of each trolley 16 is operatively connected to suitable impact bumper means including a bumper tongue (not shown) movably mounted upon the load carrier suspended by the trolleys. Thus when such bumper tongue impacts the rear of a halted trolley preceding the same the control rod 26 of the impacting trolley is released from sustaining engagement with the trolley pusher dog 22, and the latter drops from the operative solid line position thereof in FIG. 2 to the dotted line position. As halted by the trolley in advance thereof, the succeeding trolley also comes to halt.

Otherwise the forward pusher dog 22 is rigidly sustained by rod 26; and one of the features of the mechanism 14 deals with this circumstance. It is to be understood that as the trolleys enter the stop and release zone 13 (FIG. 1A) and are halted by mechanism 14, the pusher dog 22 of the trolley remains in its elevated, operative position, ready to be engaged and the trolley advanced by the lower line pusher 24, as the latter is controlled by mechanism 14.

Referring to FIG. 2, further reference being also had to FIG. 3, the main power line structure comprises the overhead power chain trolley track 11, which is of familiar I-beam cross section, and is suitably supported in an entirely conventional manner by means of an appropriate superstructure (not shown). A conventional type of power chain pusher trolley 29 includes pairs of forward and rearward wheels 30 carried by trolley yokes 31 articulated to links of the main power conveyor power chain 32, the wheels 30 riding the lower flanges of the track 11. The power chain pushers 24 are carried by chain links intervening between the yokes 31, also in an entirely conventional fashion.

The main power track 11 is interrupted along its length, at ends 33 facing one another, to provide a zone in which the flexible rail provisions of the invention operate.

The free trolley 16 has its track members 20 supported by means of suitable hangers 33' from the power conveyor track 11, and/or from its supporting superstructure. All provisions of this nature may be well known in the art.

As shown in FIG. 2, also in FIGS. 8 and 12, the dot-dash reference line "x" may be considered the vertical and front-to-rear center line of the stop and release station 13 at which a trolley 16 is to be halted, as pending a drop and return action of the section 10, then forwarded onto that section when it is at the level of the fixed free track 12. The dot-dash reference line "x" may also be considered, then, as the longitudinal center line of the mechanism 14.

A considerable number of the operating parts of the stop and release mechanism 14 are supported on superstructure sustained by the monorail track I-beam 11 of the installation. As shown in FIGS. 2 and 3, a pair of elongated channel members 34 are provided, being disposed horizontally and in parallel, transversely spaced relationship to one another (FIG. 3), with the flanges thereof facing oppositely outwardly. The upright webs of these channels are preferably equipped, adjacent and on opposite sides of the longitudinal center line thereof, with suitable anti-friction wear strips 35, leaving a vertical space 36 therebetween in which a control plate (to be described) of the flexible rail of the mechanism operates.

The supporting channel members 34 are mounted to the track 11, as shown in FIG. 2, by rigid upright plates 38, which may be bolted, welded or otherwise secured to the power line track.

Referring in particular to FIG. 2, the track 11 may be provided at its left-hand zone of entry to the stop and release mechanism 14, with a special inclined adapter track section 39, at which the power chain trolley 29 constituted by the yokes 31 and track rollers 30 commences a mildly inclined downward travel. One of the supporting plates 38 for the proposed channels 34 is secured to this adapter track section 39, the latter providing one of the inwardly facing ends 33 of the track.

An essential component of the stop and release mechanism 14 is an elongated rail or track member 40 of flexible steel strip material (see FIGS. 3, 4 and 5 also), which horizontally bridges the distance between adjacent cut away ends 33 of the fixed power chain track 11 at either side of the stop and release station 13. This member 40 is capable of limited upward and downward flexure, as between the solid and dotted line positions of FIG. 2.

The flexible strip 40 performs the function of the flanges of the power chain track 11 in supporting the power chain trolley rollers 30, and is therefore of a width approximately equal to the overall transverse width of that track. Flexible rail 40 is of a length sufficient to over-span the distance between the adjacent ends 33 of the power chain track on either side of the stop and release station 13 and is hence a continuation of the track 11 across this zone. It is anchored at its ends in these places, as by the use of strap members 41, 42 bolted to the respective adjacent track members and rigidly clamping the ends of rail strip 40 to the latter from beneath. For this purpose the lower flanges of the track members are cut back somewhat.

In flexing between the solid and dotted line positions of FIG. 2, as it is elevated and lowered by provisions to be described, the flexible rail 40 correspondingly elevates and lowers the power chain pusher 24 whose trolley travels the rail between its solid and dotted line positions, in the former of which it is at an elevation for propelling engagement with the trolley dog 22, and in the latter of which it is incapable of such propelling engagement.

The reference numeral 44 designates an operating plate of generally triangular outline for the flexible rail strip 40. It is vertically disposed along and over the longitudinal center line of the strip, as shown in FIG. 3; and the plate 44 is upwardly received in the space 36 between the supporting channel members 34 of mechanism 14. Referring to FIG. 5 of the drawings in conjunction with FIG. 2, the lower edge of plate 44 is cut away in a rectangular outline at 45, centrally thereof, to receive a thickened attaching member 46, which is rigidly secured in this cut away area, as by welding at 47. A relatively short bracing plate 48 is disposed beneath strip 40 along its central zone, and bolts or studs 49 are placed through apertures in the strip and bracing plate, being upwardly threaded into the attaching member 46.

Pairs of elongated angle irons 51 are provided to extend toward one another from each of the track member ends 33, being on opposite sides of the plate 44 and in predeterminedly spaced relationship to and above the lower edge of the latter. The inner ends of these angle irons terminate in a slightly longitudinally spaced relation to one another adjacent either side of the longitudinal center point of plate 44, for moving clearance. At the opposite outer ends thereof each of the angle irons 51 has a pivoting strap 52 welded or otherwise fixed thereto, which straps are pivotally connected at 53 to the respective fixed suspending plates 38 carried by channels 34. At the adjacent inner ends thereof, the horizontal flanges of the respective angle irons, designated 51', have fixed upstanding pivot lugs 55 welded thereto; and pivot pins or studs 56 extend through these lugs and through the plate 44, on either side of the center point of the latter.

In order to provide a stable pivot connection of the angle irons 51 to the plate at the studs 56 the plate may have supplementary blocks 57 welded to its sides across its center zone. The upright flanges of angle irons 51 are cut back at 51'' to accommodate these blocks.

Thus, as the plate 44 is elevated and lowered by the provisions to be described, the angle irons 51 are correspondingly swung about their pivots at 53. The horizontal flanges 51' of these angle irons constitute, in effect, a continuation of the upper flanges of the power chain track 11 across the stop and release zone 13 and mechanism 14, the angle irons moving with the flexible rail strip 40 as the latter is elevated and lowered through the agency of its central connection with the lower portion of plate 44 at thickened portion 46.

In order to hold down the power trolley rollers 30 as the pushers 24 pass into and through the stop and release station 13, whether the pusher 24 is lowered or not, the pivoted angle iron members 51 are provided with hold-down strips 58 upon the lower surface of the horizontal flanges 51' thereof. These strips bridge the small gap between adjacent ends of the channels (FIGS. 2 and 4) and insure that the power chain rollers will have a smooth traverse into and through the stop and release zone 13.

It is evident from the above that, with a trolley 16 and its load, represented by the stop member 27 on a load carrier (not shown), arriving at the center line "x" of the stop and release zone 13, as shown in FIG. 2, if the bridging flexible track rail or strip 40 is in its solid line position, the pusher 24 of the power chain 32 will be in the lowered, solid line position capable of engaging the trolley pusher dog 22 and propelling trolley 16 forwardly out of the stop and release station 13, and other parts of the mechanism 14 will be in the release position depicted in solid line in FIG. 2, as later described. However, if appropriate signals have not been forwarded by the units of FIG. 8 and FIGS. 9–11, the track rail 40 remains in its elevated, dotted line position of FIG. 2, elevating the power pusher 24 to its dotted line position to pass above the trolley dog 22, just as it passed above the corresponding dog 22 of a trolley waiting behind the one halted at the stop and release zone. Provisions for operating plate 44 to position strip 40 in the manner described will be hereinafter described.

The stop and release mechanism 14, in addition to the flexible rail raising and lowering guide provisions just described, includes stop means to coact with the stop abutment member 27 of the load carrier in positively halting the load and its trolley 16 at station 13. To this end, as shown in FIG. 2, a fixed upright side bracket 60 is fixedly secured, as by bolts or studs 61, to an outer side of one of the free track members 20, forwardly of the center line "x," serving as a mount for certain of the stop provisions, and a similar rear bracket 62 is similarly secured to the track member on the opposite longitudinal side of the center line "x." The sole function of the bracket 62 is to pivotally support an anti-rebound dog 63 in the path of the load carrier stop member 27, as illustrated in FIG. 2, and the action is well known in the art.

The other bracket 60 has pivotally mounted thereto at 65, directly beneath the track member 20 to which the bracket is mounted, an arm 66, which arm at its outer end journals a stop roller 67; and the roller 67 as thus carried is selectively positionable either in its solid line elevated or release position of FIG. 2, in which a load carrier stop 27 travels freely therebeneath, or in its depressed, dotted line position, in which it is engageable with such stop member 27 to halt the load, hence also the trolley 16 thereabove from which the load is suspended.

The roller carrying arm 66 is provided with an adapter bracket 68 in fixed relation thereto, which may also serve as a part of the means for journaling stop roller 67. Adapter 68 extends upwardly on the outer side of the track member 20, and an adjustable connecting rod or link 69 is pivotally mounted thereto at 70, the rod extending upwardly to provisions to be described for simultaneously controlling the plate 44 and stop roller 67.

The supporting channel members 34, as illustrated in FIGS. 2 and 3, furnish support for the provisions just referred to. Pairs of upright forward and rearward channel members 71 have their bottoms welded to the top flanges of the channels 34, and parallel horizontal angle irons 72 extend between the members 71 and are rigidly fixed to the upper sides thereof to provide a top frame unit, generally designated 73, supporting the operating means (to be described) for the control plate and stop roller provisions 44, 67 of mechanism 14.

A suitable power unit, such as a double acting pneumatic cylinder 74, is bolted or otherwise fixedly supported to the top of frame unit 73, and the plunger rod 75 of such cylinder extends downwardly to an adjustable pivot connection at a clevis 76 to the top center portion of the triangular plate 44. The vertical throw of the pneumatic cylinder 74 and its clevis-connected plunger rod 75 may be limited, as best shown in FIG. 3, by providing a short length of angle iron 78 fixed to one side of the top of plate 44, the horizontal flange of the angle iron being apertured to receive a fixed upright threaded stud 79 with sufficient clearance for free movement. Stud 79 is rigidly secured, as by nuts 80, to one of the upper flanges of a channel member 34; and pairs of limiting stop and lock nuts 81, 82, respectively, are adjustable upon the stud 79 to limit the up and down throw of the plate 44 to which angle iron 78 is secured.

Referring to FIG. 3, the supporting channel 34 opposite that upon which the motion-limiting provisions just described are mounted has welded thereto a laterally outwardly extending adapter block 84. This pivotally mounts a walking beam type of actuator arm 85, as at a pivot pin 86 medially of the length thereof; and the arm 85 is provided adjacent one end thereof with a plurality of apertures 87, at which the upper end of the connecting rod or link 69 for stop roller 67 may be pivotally connected. The opposite outer end of arm 85 is provided with a slot 88 receiving a pin or stud 89 projecting from the adjacent side of the plate 44 of mechanism 14.

The pneumatic power cylinder unit 74 is reversibly operated, under suitable solenoid-operated control, such as a conventional double acting solenoid valve unit 90 on top frame 73 adjacent cylinder unit 74, to move the plate 44 up and down in response to switch signals, of a type to be described, applied to the solenoids of such control unit. Details of the conduitry between cylinder 74 and the solenoid valve unit 90, and of the wiring of the latter other than as shown in the basic diagram of FIG. 14, are not part of the invention and, moreover, will readily suggest themselves to those skilled in the art.

Thus, with cylinder 74 operated to project its plunger 75 downwardly, a corresponding movement of plate 44 operates, through the connection of that plate to the flexible track strip 40 and to the angle iron members 51 pivotally connected to the plate at 56 and to the frame structure at 53, to shift the track strip 40 downwardly from its dotted line position of FIG. 2 to its solid line position. This drops a power chain pusher 24 to the solid line position for impelling engagement with the trolley pusher dog 22, as described above.

Assuming that the stop roller 68 of the mechanism 14 has been in the dotted line position of FIG. 2, the downward movement of plate 44 described above causes the pin or stud 89 thereon to impart a counterclockwise movement to arm 85 about its pivot to the plate at pin 86. This raises the connecting rod or link 69, correspondingly raising the stop roller 67 to its solid line release position of FIG. 2, and enabling the halted trolley 16 and its load to proceed forwardly under propulsion by the pusher 24 of the power chain conveyor 32.

When the motion of plate 44 is upward, an opposite train of events transpires; the stop roller 67 is lowered and the track strip 40 is elevated from solid to dotted line position, thus elevating the power chain trolley rollers 30, the power chain 32 and the chain pusher 24 to inoperative position shown in dotted line in FIG. 2.

In operation in a drop section mechanism such as that of FIG. 1A, using automatically accumulating trolleys 16 of the type shown in FIGS. 2 and 7 of the drawings, and further assuming that the drop section 10 is not up to conveyor level, i.e., with trolley track portions thereon in horizontal alignment with the track members 20, the trolleys 16 and load carriers thereon will be moved along the free track 12 (FIG. 1A), usually manually or gravitationally under a slight incline of track 12. The forward pusher dogs 22 thereof are rigidly sustained upwardly by the respective control rods 26. The first approaching trolley and its load will be halted as above described by the flexible track stop and release mechanism 14 at the stop and release station 13. At this time a succeeding trolley or trolleys and their carriers may impact and automatically accumulate behind the halted trolley. Due to the action of their automatic provisions, the control rod 26 may drop out of sustaining engagement with the pusher dog 22 thereof, the latter thus dropping to the dotted line position shown in FIG. 2; however, the effect on the system is nil since the power chain pushers 24 in any event pass the trolleys in this zone at an elevation substantially above the trolleys.

When the drop section is elevated to conveyor position (assuming that proper signals have been received at the solenoid valve unit 90 to safeguard against two eventualities), the mechanism 14 will have its stop roller 67 in solid line position and its flexible track rail 40 also in solid line position, whereupon the chain pusher 24, also in solid line position, will engage behind the trolley dog 22 and forward the same onto the drop section, where it may again be halted by provisions not germane to the present invention.

The two circumstances to be safeguarded against are, as indicated previously, (a) a condition in which the rail 40 and pusher 24 might be lowered without a trolley and its load unit halted and waiting at the stop and release station 13, in which case the pusher might pick up a trolley advancing into station 13 to drive the same forcibly into the latter; and (b) a condition in which a trolley and its load are halted at the station 13, but at a time when the power chain pusher 24, in traversing the still elevated or not completely lowered track rail 40, is directly above the pusher dog 22 of the trolley, i.e., adjacent center line "x" and directly above the pusher dog 22. Since the pusher dog 22 is rigidly sustained from beneath, this would result in jamming the pusher 24 onto the dog 22, with possible resultant damage, and certainly without cleanly picking up the trolley as desired.

FIG. 7 of the drawings shows such undesired situation, with the pusher 24 shown in dotted line being lowered adjacent the center line "x" toward and onto a trolley dog 22 at the stop and release zone 13; while in solid line FIG. 7 shows the pusher properly moving downwardly to its operative, propelling level at some zone, indicated by the reference line "y," on the approach side of the stop and release zone.

Therefore, signaling provisions of the character shown in FIG. 8, involving a limit switch unit generally designated 91, insure that the stop and release mechanism 14 will be operated only when a trolley 16 and its load are in and halted at the stop and release station 13, and later described provisions of the character shown in FIGS. 9, 10 and 11 are made to coordinately insure that, with the trolley and its load at the stop and release station, the power chain pusher 24 will have been lowered at the zone "y" to prior to full advance of such pusher to the center line "x."

The trolley 16 is schematically represented in FIG. 8 by its forward and rearward pairs of load rollers or wheels 18, 19. A suitable bracket 91' is fixedly mounted to one of the free tracks 20, extending upwardly therefrom and providing a ball bearing pivot at 92 for an actuator bell crank 93, to one arm of which a switch actuating finger is bolted to extend forwardly over the zone traversed by one set of the forward and rearward trolley rollers 18, 19. The hold down member 28 (FIG. 2) overlies the other set. The other arm of bell crank 93 is provided with a suitable offset lug 95 engageable with the operating finger 96 of a dual acting switch 97 fixedly mounted upon bracket 91'. Operating finger 96 occupies the solid line, actuated position of FIG. 8 when a trolley is present and halted at the stop and release zone, otherwise being in the position shown in dotted line. The wiring of switch 97 will be hereinafter referred to in connection with FIG. 14, but it may be noted in that figure that the switch has two connected and oppositely acting contacts 97a and 97b.

Reference should now be had to FIGS. 9, 10 and 11, showing the signal provisions for insuring that the lowering of the flexible track rail 40 and power chain pusher 24 takes place prior to arrival of the pusher at the stop and release zone 13, i.e., adjacent the reference line "y" of FIG. 7. The limit switch control unit for the purpose referred to is generally designated 99, and the positional relationship of the two signal control units 91, 99 is indicated in a general way in FIGS. 2 and 12.

A fixed mounting bracket 100 of L-shaped cross section is provided for the signal unit 99, being bolted to the free trolley track 20 which carries the mounting bracket 91' for the signal unit 91 previously described. A horizontal plate 101 is bolted to the top flange of the bracket 100, this plate supporting an upright pin or post 102 upon which the inner race of an anti-friction ball bearing 103 is mounted, with retaining provisions for the bearing in the form of a washer 105 and nut 106 applied to the mounting stud 102. The arcuate end portion 107 of a strap metal type which operating lever 108 patrially encircles and is tack welded to the outer race of bearing 103, this lever having an angled actuating arm or extension 109 fixedly secured thereto.

Extension 109 extends transversely into and then forwardly along the path of travel of the power line pushers, ending adjacent the center line "x."

Switch operating lever 108 carries a still further arm extension 111, as secured thereto at 110, which projects past the operating button 112 of a normally open, single acting switch 113 mounted on plate 101. A coil tension spring 114 acts between an out-turned end of operating lever 108 and an adjustable fixed limiting stop 115 for the lever, thus to urge the lever extensions 109, 111 counterclockwise (FIG. 9) to the solid line positions thereof.

In order to enable the switch provisions referred to to be properly positioned in relation to the path of travel of the pushers 24, the mounting plate 101 is adjustably secured to the horizontal flange of the mounting bracket 100, as by means of bolts 116, 117 extending through holes in plate 101 and elongated slots 118 in the bracket flange in question.

The elevation of the actuating arm extension 109 is such that it will be engaged to close switch 113 by every power chain pusher 24 approaching the stop and release zone 13, regardless of the existing or changing elevation of that pusher, and will remain engaged by the latter as the pusher reaches the center line "x."

FIG. 14 is a very simple schematic wiring diagram for the control of the solenoid operated valve unit 90 to govern the operation of pneumatic cylinder unit 74 by governing the application of air pressure to opposite sides thereof. Thus one solenoid coil or winding 120 may be considered as controlling the valve to initiate downward motion of the plunger 75, and another coil 121 to be the coil producing upward motion. Coil 120 is connected in series with the switch 113 operated by the power chain pushers 24, and with one contact 97a of the switch 97 which is actuated by a trolley 16 entering the stop and release station in the manner of FIG. 8. The other contact 97b of switch 97 is ganged with the contact 97a for reverse operation in a well-known way, and contact 97b is connected in series with solenoid coil 121. The two series connections are connected in parallel across line leads 122.

In operation, solenoid coil 121, controlling upward movement of air cylinder plunger 74 is normally energized continuously through closed switch contact 97b. However, when a free trolley 16 enters the stop and release zone it causes this contact to be opened and the other contact 97a of the pair to be closed. The elevating solenoid coil 121 is thus de-energized, but the valve of unit 97 is not shifted as yet.

Closure of contact 97a preliminarily conditions the circuitry to valve unit 90 for the downward actuation of plunger 75, the circuit being completed when normally open switch 113 is closed upon passage of a trolley pusher 24, whereupon cylinder 74 is energized to depress the flexible rail strip 40 to the solid line position of FIG. 2. It simultaneously elevates the stop roller 67 to its solid line, retracted or release position; and upon engagement of the lowered chain pusher 24 with the trolley dog 22 the trolley 16 will be advanced out of the stop and release zone 13.

As the pusher and trolley move forward together, switch 113 is first released. This de-energizes the rail lowering solenoid coil 120, but without effect on the valve as to the lift action of air cylinder 74. However, when the operating finger 96 of switch 97 is released by departure of the trolley its contact 97b is re-closed. This energizes the rail elevating solenoid coil 121, thus to move the flexible strip 40 upward, and to restore the stop roller 67 downward, to the dotted line positions of FIG. 2. The mechanism 14 now awaits the arrival of another trolley 16 to repeat its cycle of operations described above.

It is desirable that the stop and release mechanism of the invention be supplemented to handle the accumulation of trolleys to the rear of station 13 which are not equipped with the automatic provisions of the trolley 16 shown in FIG. 2, for the purpose of preventing rear impact of a following trolley against a preceding halted one. This is especially desirable when the load suspended from such trolley lacks a protective bumper, with the possibility of damage to transported work pieces by collision if they are not kept separated.

Indeed, as far as the automatically accumulating type of trolley is concerned, the primary significance of the invention is in the provision of the signal means of FIGS. 9, 10 and 11 to insure that the power chain pusher 24 will not come down directly upon a rigidly sustained trolley dog 22. As it happens, in the installation shown a trolley of any type will be sufficiently below the path of travel of the pusher 24 prior to entry into the stop and release station that the pusher 24 will miss engagement with the trolley, whether or not its dog 22 is elevated.

Nevertheless, it is a fact that, in the use of the accumulation type trolleys the engagement of an impact responsive accumulating device on one trolley and load assembly with the rear of a preceding assembly might cause the rear unit to be accidentally towed forward by the one impacted, particularly in the event the load carrier of the towed unit is unoccupied and of light weight.

Therefore, in the case of either type of load unit it may well be desirable to associate with, and as a part of, the stop and release mechanism 14 one or more automatic stop devices to the rear of the main stop and release station. Such provisions are illustrated in FIGS. 12 and 13 of the drawings; and since the mechanism itself is practically identical to that of FIGS. 1 through 11, corresponding reference numerals will be employed to designate corresponding parts and relationships, and further description will be dispensed with to the extent that the operation is the same. It may be noted, however, that FIG. 12 shows a unitary bracket, specially designated 124, fixedly applied to one of the free line track members 20 to provide the support for stop and release parts which is in the earlier embodiment provided by separate brackets 60, 62. Likewise, it is to be noted that FIG. 12 shows better than FIG. 2 the positional relationship of the signal switch units of FIG. 8 and of FIGS. 9 through 11 with respect to the center line "x" of the stop and release mechanism.

In this embodiment, the actuating bell crank 93 for signal switch 97, in addition to operating the finger 96 of that switch, is provided with an upward extension arm 125. At a predetermined distance rearwardly of the main stop and release zone 13, as determined by the desired longitudinal spacing of the accumulated trolleys, here specially designated 126, as they await forwarding to the main stop and release zone, the free line track 20 carries another mounting bracket 127 similar to the bracket 124 previously described. This bracket pivotally mounts an anti-rebound finger 128 and a stop arm 129 similar to the arm 66, with a stop roller 130 also similarly journaled on the arm. A link 131 is pivotally mounted on the axis of roller 130 and extends upwardly past the free track structure 20 where it is pivotally connected at 132 to an adjustable rod 133. The opposite end of this rod is pivotally connected at 134 to the upper end of the extension arm 125 of switch bell crank 93.

Bell crank 93 is biased clockwise, as viewed in FIGS. 12 and 13, by means of a rod 136 pivoted thereby at 137 intermediate the length of the extension arm 125. A coil spring 138 surrounds rod 136, acting between a shoulder member 139 fixed on the latter and a fixed guide 140, through an aperture in which the rod 136 extends. The member 140 is fixedly secured to a free line track, as by means of a bracket 141 (FIG. 13).

It is desirable, as a further refinement on the structure of FIG. 12, to provide the bell crank arm extension 125 with a plurality of apertures 142, as well as to provide the rear link 131 with a like series of apertures 143, in order to provide a convenient adjustment of the connection as determined by the desired spacing and length of the respective rods 133 and 136. In any event, it is contemplated that the lengths and adjustments shall be so selected as to permit the use of standard brackets 124 and stop arms 66, 129 in installations involving different rearward spacings of the auxiliary stop units. These are generally designated by the reference numeral 145 in FIGS. 12 and 13 to differentiate the same from the main stop and release mechanism 14.

FIG. 12 shows in solid line the position of the stop roller 130 in engagement with the stop abutment 27 carried by the load or bumper member (not shown) suspended from a rearward trolley 125. It also shows in solid line the stop roller 67 of the main stop and release mechanism, as previously described, in this case in its elevated, release position relative to the abutment stop 27 of a load presently halted at the stop and release station 13.

In operation, an actuation of the switch 97 by a trolley 126 at the main stop and release mechanism 14, thus to close its contact 97a and open its contact 87b (FIG. 14), as coupled with an actuation of the switch 113 by a chain pusher 24 to close the last named switch as the pusher moves toward the stop and release zone, will result as before in lowering of the pusher 24 to operative propelling position and elevating of the stop roller 67 to release position.

As this has happened, the switch bell crank 93 has moved counterclockwise, causing its arm extension 125 to transmit thrust through rod 133 to link 131, with the result that the stop roller 130 of the auxiliary rear stop mechanism 145 has been lowered and placed in its solid line position of that figure. The stop abutment 27 of a succeeding load unit is thus engaged and the latter is halted behind the trolley at the main stop and release zone, which trolley is now released for forward travel. Upon such forward travel, attended by actuation of the switches 97 and 113 to restore the pusher 24 upwardly and the main stop roller 67 downwardly, the linkage represented by extension arm 125, rod 133 and link 134 shifts the auxiliary rear stop roller 130 upwardly, permitting the load unit to be advanced manually or gravitationally into the main stop and release zone 13.

It is also contemplated that in a drop section installation, as according to the Bishop patent identified above, with or without the stop provisions of the invention being provided in advance of the drop section, a simplified flexible track or device may be provided directly above the drop section.

Such device, lacking the stop roller, pneumatic cylinder solenoid valve and associated provisions of the mechanism 14, will simply incorporate a rail strip 40 anchored at its ends on opposite sides of the vertical drop zone, and at an elevation to cause the power chain pusher 24 to engage the trolley dog 22 to propel the trolley 16 onto and off the drop section when the latter is at elevated level. Provisions similar to those of FIG. 2 will be made for pivotally mounting the angle irons 51 and a guide plate associated therewith, similar to the plate 44, onto fixed end supports.

The only difference will be in the elimination of the automatic actuating provisions both for elevating the strip 40 and for stopping the trolley. The sole function of the simplified device will be, in the event the ascending drop section elevates a trolley and load thereon exactly at the time that the power chain pusher 24 is directly above the trolley, a destructive collision of pusher and trolley will not take place. The dog 22 will simply engage and elevate the chain pusher 24, the rail strip 40 and supports therefor flexing and being similarly elevated.

The flexible rail mechanism is extremely inexpensive to manufacture due to its simplicity and economy of parts. Moreover, there is little or no need for periodic inspection as to its component flexible rail member 40 and associated guide parts. The trolley stop, accumulation and release structure is also simple, reliable and inexpensive; and the mechanism is very versatile in regard to the applications to which it may be put without requiring special redesign of its basic components.

What I claim as my invention is:

1. A track device for association with a track along which travel a series of pusher-propelling members having pushers to engage and advance load units in a path paralleling the direction of the track and in transversely spaced relation thereto, said device comprising an elongated flexible track member along which said propelling members travel, said track member having longitudinally spaced means fixedly supporting the ends thereof and being capable of transverse flexing movement between said ends, said supporting means including means fixedly securing at least one of said ends to said track at a level of that track to constitute a continuation of the latter.

2. A track device for association with a track along which travel a series of pusher-propelling members having pushers to engage and advance load units in a path paralleling the direction of the track and in transversely spaced relation thereto, said device comprising an elongated flexible track member along which said propelling members travel, said track member having longitudinally spaced means fixedly supporting the ends thereof and being capable of transverse flexing movement between said ends, said track being interrupted in an intermediate zone along the length thereof and said supporting means including means fixedly securing said track member ends to ends of said track facing said interrupted zone and at the level of that track to constitute an intermediate continuation of the latter.

3. A track device for association with a track along which travel a series of pusher-propelling members having pushers to engage and advance load units in a path paralleling the direction of the track and in transversely spaced relation thereto, said device comprising an elongated flexible track member along which said propelling members travel, said track member having longitudinally spaced means fixedly supporting the ends thereof and being capable of transverse flexing movement between said ends, said track being interrupted in an intermediate zone along the length thereof and said supporting means including means fixedly securing said track member ends to ends of said track facing said interrupted zone and at the level of that track to constitute an intermediate continuation of the latter, and relatively rigid, movable supporting means engaging said track member to move the same for said transverse flexing thereof.

4. A track device for association with a track along which travel a series of pusher-propelling members having pushers to engage and advance load units in a path paralleling the direction of the track and in transversely spaced relation thereto, said device comprising an elongated flexible track member along which said propelling members travel, said track member having longitudinally spaced means fixedly supporting the ends thereof and being capable of transverse flexing movement between said ends, said track being interrupted in an intermediate zone along the length thereof and said supporting means including means fixedly securing said track member ends to ends of said track facing said interrupted zone and at the level of that track to constitute an intermediate continuation of the latter, a relatively rigid, movable supporting member secured to said track member to move the same for said transverse flexing thereof, and means pivotally connected to said track at opposite sides of said interrupted zone for mounting said supporting member for transverse movement of the same and of said track member.

5. A control mechanism for association with a track along which travel a series of pusher-propelling members having pushers to engage and advance load units in a path paralleling the direction of the track and in transversely spaced relation thereto, said mechanism comprising an elongated flexible track member along which said propelling members travel, said track member having longitudinally spaced means fixedly supporting the ends thereof and being capable of transverse flexing movement between said ends, said supporting means including means fixedly securing at least one of said ends to said first named track at the level of that track to constitute a continuation of the latter, and a relatively rigid movable supporting member secured to said track member to move the same for said transverse flexing, thereby moving the propelling members and pushers transversely into and out of operative position for engagement of the latter with a load unit, an operating device, and means operatively connecting said operating device to said supporting means for said track member to move said track member in and out of said operative position for said pushers to engage and advance load units.

6. A control mechanism for association with a track along which travel a series of pusher-propelling members having pushers to engage and advance load units in a path paralleling the direction of the track and in transversely spaced relation thereto, said mechanism comprising an elongated flexible track member along which said propelling members travel, said track member having longitudinally spaced means fixedly supporting the ends thereof and being capable of transverse flexing movement between said ends, said first named track being interrupted in an intermediate zone along the length thereof and said supporting means including means fixedly securing said track member ends to ends of said first named track facing said interrupted zone and at the level of that track to constitute an intermediate continuation of the latter, and a relatively rigid, movable supporting member secured to said track member to move the same for said transverse flexing, thereby moving the propelling members and pushers transversely into and out of operative position for engagement of the latter with a load unit, an operating device, and means operatively connecting said operating device to said supporting means for said track member to move said track in and out of said operative position for said pushers to engage and advance load units.

7. A stop and release control mechanism for association with a track along which travel a series of pusher-propelling members having pushers to engage and advance load units in a path paralleling the direction of the track and in transversely spaced relation thereto, and a further track along which said load units travel as thus propelled, said mechanism comprising an elongated flexible track member along which said propelling members travel, said track member having longitudinally spaced means fixedly supporting the ends thereof and being capable of transverse flexing movement between said ends, said first named track being interrupted in an intermediate zone along the length thereof and said supporting means including means fixedly securing said track member ends to ends of said first named track facing said interrupted zone and at the level of that track to constitute an intermediate continuation of the latter, and a relatively rigid, movable supporting member secured to said track member to move the same for said transverse flexing, thereby moving the propelling members and pushers transversely into and out of operative position for engagement of the latter with a load unit, a releasable stop device mounted adjacent said further track to control the travel of load units therealong as the latter are engaged or not by said pushers, an operating device, and means operatively connecting said operating device to said supporting means for said track member to move said track member in and out of said operative position for said pushers to engage and advance load units.

8. A stop and release control mechanism for association with a track along which travel a series of pusher-propelling members having pushers to engage and advance load units in a path paralleling the direction of the track and in transversely spaced relation thereto, and a further track along which said load units travel as thus propelled, said mechanism comprising an elongated flexible track member along which said propelling members travel, said track member having longitudinally spaced means fixedly supporting the ends thereof and being capable of transverse flexing movement between said ends, said first named track being interrupted in an intermediate zone along the length thereof and said supporting means including means fixedly securing said track member, ends to ends of said first named track facing said interrupted zone and at the level of that track to constitute an intermediate continuation of the latter, and a relatively rigid, movable supporting member secured to said track member to move the same for said transverse flexing, thereby moving the propelling members and pushers transversely into and out of operative position for engagement of the latter with a load unit, a releasable stop device mounted adjacent said further track to control the travel of load units therealong as the latter are engaged or not by said pushers, including a movable member releasably engageable in operative position with load units to halt the same in position for said pushers to pass the load units out of propelling engagement with the same, an operating device, and means operatively connecting said operating device to said stop device and to said supporting means for said track member to coordinately move said stop member in and out of said operative load unit engaging and halting position and said track member in and out of said operative position for said pushers to engage and advance load units, and vice versa.

9. A stop and release control mechanism for association with a track along which travel a series of pusher-propelling members having pushers to engage and advance load units in a path paralleling the direction of the track and in transversely spaced relation thereto, and a further track along which said load units travel as thus propelled for advance, said mechanism comprising an elongated flexible track member along which said propelling members and pushers travel, said track member having longitudinally spaced means fixedly supporting the ends thereof and being capable of transverse flexing movement between said ends, said supporting means including means fixedly securing at least one of said ends to said track at the level of that track to constitute a continuation of the latter, said track member flexing to move said propelling members and pushers transversely into and out of operative position for engagement of the latter with load units, an operating device, means operatively connecting said operating device to said track member to flex said track member into and out of said operative position for said pushers to engage and advance load units, and a stop device mounted adjacent said further track on the side of the advance of said load units toward said flexible track member, said stop device including means releasably engageable with load units to halt the same on said further track to the rear of said flexible track member, and means coordinately operating said stop device with the operation of said flexible track member to halt a load at the former as a load unit as the latter is engaged and propelled by a pusher, and vice versa.

10. A stop and release control mechanism for association with a track along which travel a series of pusher-propelling members having pushers to engage and advance load units in a path paralleling the direction of the track and in transversely spaced relation thereto, and a further track along which said load units travel as thus propelled for advance, said mechanism comprising an elongated flexible track member along which said propelling members and pushers travel, said track member having longitudinally spaced means fixedly supporting the ends thereof and being capable of transverse flexing movement between said ends, said supporting means including means fixedly securing at least one of said ends to said track at the level of that track to constitute a continuation of the latter, said track member flexing to move said propelling members and pushers transversely into and out of operative position for engagement of the latter with load units, a stop device mounted adjacent said further track to control the travel of load units therealong as the latter are engaged or not by said pushers, including a movable member releasably engageable in operative position with load units to halt the same in position for said pushers to pass the load units out of propelling engagement with the same, an operating device, means operatively connecting said operating device to said stop device and to said track member to coordinately move said stop member out of said operative load unit engaging and halting position and flex said track member into and out of said operative position for said pushers to engage and advance load units, and vice versa, and a further stop device mounted adjacent said further track on the side of the advance of said load units toward said first stop device, said further stop device including means releasably engageable with load units to halt the same on said further track to the rear of said first stop device, and means coordinately operating said further stop device with the operation of the first stop device to halt a load at the former as a load unit as the latter is released, and vice versa.

11. A track device for association with a track along which travel a series of pusher units adapted to engage and advance load units traveling a further track in a path paralleling the direction of the first named track and in transversely spaced relation thereto, said device comprising an elongated flexible track member along which said propelling units may travel, said track member having means supporting opposite ends thereof, including means securing an end thereof to said first named track as a longitudinal continuation of the latter, and being flexible in a transverse direction to place said pusher units traversing the flexible track member into and out of position for propelling engagement with a load unit on said further track, a stop device movable into and out of position to halt movement of a load unit in the direction of said track member, and operating means operatively connected to said flexible track member and said device to operate the two coordinately to cause said device to halt movement of a load unit when a pusher unit is out of position to propellingly engage the load unit and to cause said device to move out of said position to halt movement of the load unit when said pusher unit is in position to engage and propel a load unit.

12. A track device for association with a track along which travel a series of pusher units adapted to engage and advance load units traveling a further track in a path paralleling the direction of the first named track and in transversely spaced relation thereto, said device comprising an elongated flexible track member along which said propelling units may travel, said track member having means supporting opposite ends thereof, including means securing an end thereof to said first named track as a longitudinal continuation of the latter, and being flexible in a transverse direction to place said pusher units traversing the flexible track member into and out of position for propelling engagement with a load unit on said further track, a stop device movable into and out of position to halt movement of a load unit in the direction of said track member, and operating means operatively connected to said flexible track member and said device to operate the two coordinately to cause said device to halt movement of a load unit when a pusher unit is out of position to propellingly engage the load unit and to cause said device to move out of said position to halt movement of the load unit when said pusher unit is in position to engage and propel a load unit, said operating means including means to prevent movement of the pusher unit to propelling position in the absence of a load unit halted by said stop device.

13. A track device for association with a track along which travel a series of pusher units adapted to engage and advance load units traveling a further track in a path paralleling the direction of the first named track and in transversely spaced relation thereto, said device comprising an elongated flexible track member along which said propelling units may travel, said track member having means supporting opposite ends thereof including means securing an end thereof to said first named track as a longitudinal continuation of the latter, and being flexible in a transverse direction to place said pusher units traversing the flexible track member into and out of position for propelling engagement with a load unit on said further track, a stop device movable into and out of position to halt movement of a load unit in the direction of said track member, and operating means operatively connected to said flexible track member and said device to operate the two coordinately to cause said device to halt movement of a load unit when a pusher unit is out of position to propellingly engage the load unit and to cause said device to move out of said position to halt movement of the load unit when said pusher unit is in position to engage and propel a load unit, said operating means including means to prevent movement of the pusher unit to propelling position in the absence of a load unit halted by said stop device, and means insuring the movement of said flexible track member and pusher unit thereon toward propelling position of the latter prior to its actually engaging the load unit.

References Cited in the file of this patent
UNITED STATES PATENTS

| | | |
|---|---|---|
| 2,612,847 | Burrows | Oct. 7, 1952 |
| 2,950,688 | King | Aug. 30, 1960 |
| 2,956,514 | Bishop | Oct. 18, 1960 |